United States Patent
Tamaki et al.

[11] Patent Number: 5,880,570
[45] Date of Patent: Mar. 9, 1999

[54] METHOD AND APPARATUS FOR CONTROLLING A SYNCHRONOUS MOTOR

[75] Inventors: Satoshi Tamaki; Yasuhiro Kondo, both of Hirakata; Yasufumi Ikkai, Kobe, all of Japan

[73] Assignee: Matsushita Electric Industrial Co., Ltd., Osaka-fu, Japan

[21] Appl. No.: 651,134

[22] Filed: May 21, 1996

[30] Foreign Application Priority Data

May 24, 1995 [JP] Japan ..................................... 7-124813

[51] Int. Cl.[6] ....................................................... H02P 1/46
[52] U.S. Cl. ......................... 318/700; 318/720; 318/721; 318/722
[58] Field of Search ...................................... 318/720, 700, 318/721, 722, 811, 723, 803, 724, 432, 139, 52, 801

[56] References Cited

U.S. PATENT DOCUMENTS

| | | | |
|---|---|---|---|
| 4,384,240 | 5/1983 | Sloan | 318/255 |
| 5,345,155 | 9/1994 | Masaki et al. | 318/138 |
| 5,471,384 | 11/1995 | Nakashima et al. | 364/424.01 |
| 5,629,603 | 5/1997 | Kinoshita et al. | 320/11 |

*Primary Examiner*—William M. Shoop, Jr.
*Assistant Examiner*—Kim Lockett
*Attorney, Agent, or Firm*—Panitch Schwarze Jacobs & Nadel, P.C.

[57] ABSTRACT

An inverter(3) for driving a motor(4) of an electric automobile(20) produces a three-phase PWM current. When the torque reference is zero, alternatively or when the torque reference is zero and motor speed is no higher than a predetermined value, the inverter(3) is controlled to be cut off so that current from a main power battery(9) is suspended or stopped.

9 Claims, 7 Drawing Sheets

FIG. 4 (General & Prior Art)

FIG. 5 (Prior Art)

FIG. 6A (Prior Art & General Art)

FIG. 6B (Prior Art & General Art)

FIG. 7A (Prior Art & General Art)

FIG. 7B (Prior Art & General Art)

METHOD AND APPARATUS FOR CONTROLLING A SYNCHRONOUS MOTOR

FIELD OF THE INVENTION AND RELATED ART STATEMENT

1. Field of the Invention

The present invention relates to an improvement in a PWM control method and a control apparatus for an inverter which is for controlling a synchronous motor. The control method and apparatus are particularly suitable for battery-driven electric cars using synchronous motors of permanent magnet rotor type.

2. Description of the Related Art

In an inverter of pulse width modulation control for driving a motor, especially such as a synchronous motor, in general, a triangular waveform signal, which is a reference signal is compared with a torque reference which instructs or commands an amount of torque of motor. A pulse signal of a duty ratio proportional to a level of torque reference is output from the comparator. A voltage which is applied to the motor, hence an output torque thereof is controlled on the basis of the pulse signal.

Figure 4:
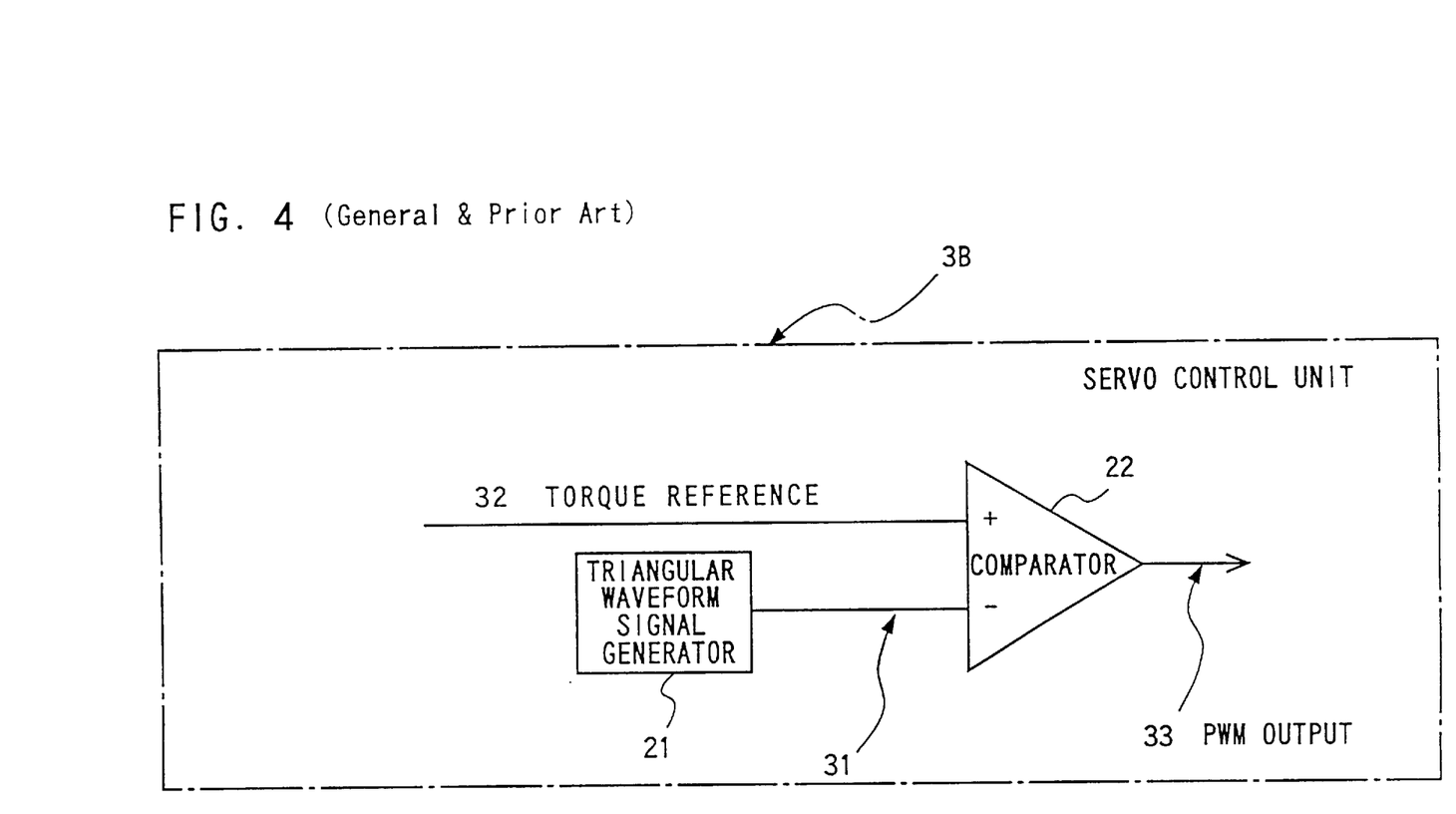
FIG. 4 shows the circuit for generating the pulse width modulation output (PWM output) which is used in common in the present invention and the prior art.
Figure 6A:
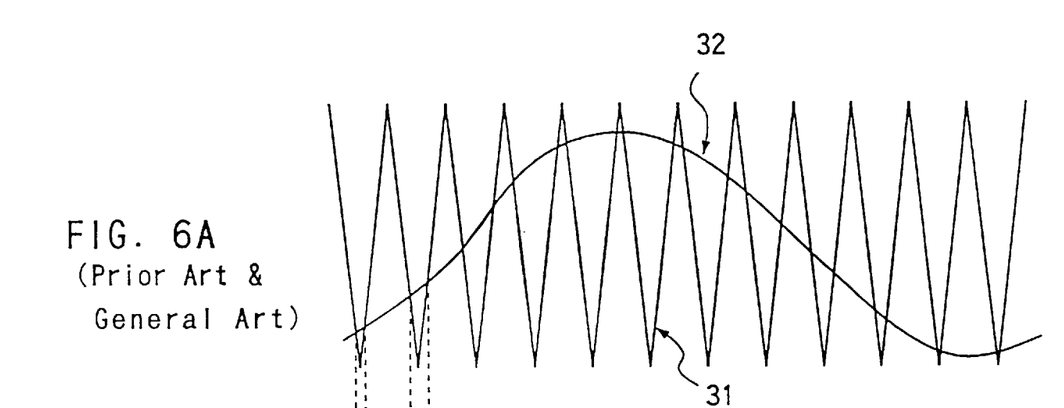
FIG. 6A is the diagram representing the triangular-waveform signal 31, and the torque reference 32.
Figure 6B:
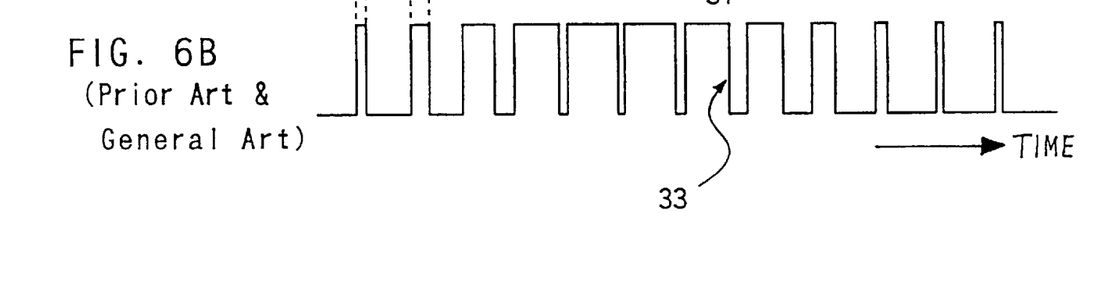
FIG. 6B is the diagram representing pulse width modulation output which is used in common for the present invention and the prior art.

In a conventional pulse width modulation circuit as shown in FIG. 4, a reference triangular waveform signal 31 of a triangular waveform signal generator 21 is compared with a torque reference 32 by a comparator 22. Consequently, as shown in FIG. 6B, a pulse-width modulated output 33 which varies gradually in a pulse width as shown in FIG.6 is output from the comparator 22.

A duty ratio of the pulse-width modulation output 33 varies substantially in proportion to a level of the torque reference 32.

Figure 5:
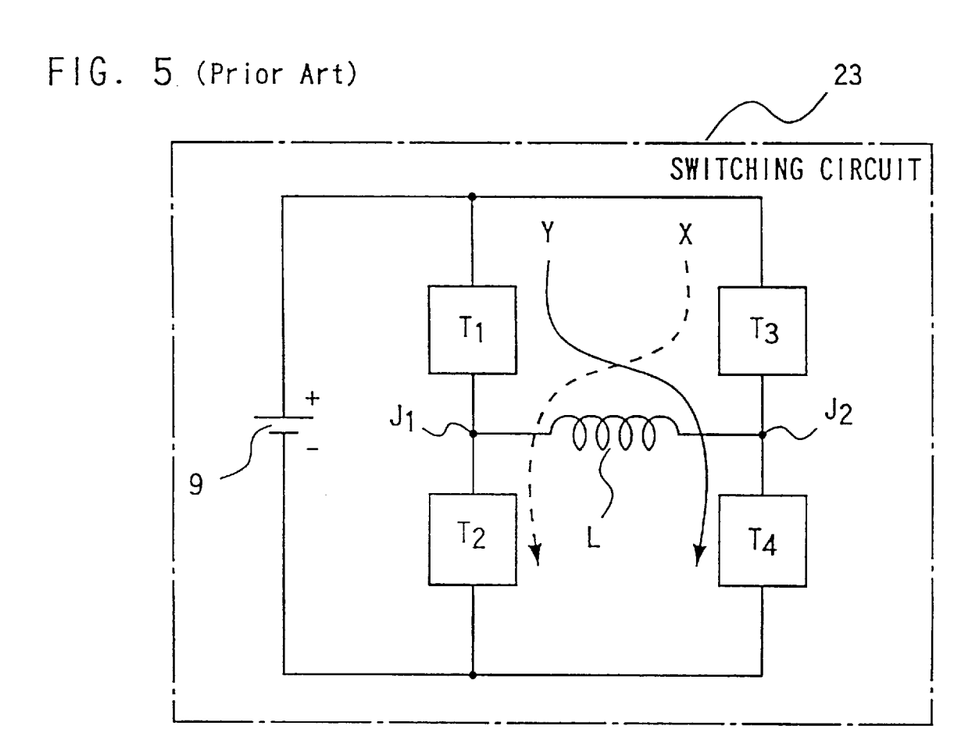
FIG. 5 shows the circuit of an output unit which is used in common in the present invention and the prior art.

With respect to one coil L of the motor, operation of the inverter of the pulse width modulation control is described with reference to FIG. 5. Switching elements e.g. thyristor $T_1$ and $T_2$ are connected in series across a direct-current power supply (series connected batteries) 9. Other similar switching elements $T_3$ and $T_4$ are also connected in series across the direct-current power supply 9. The coil L is connected across a junction $J_1$ of the switching elements $T_1$ and $T_2$ and a junction $J_2$ of the switching elements $T_3$ and $T_4$. The switching elements $T_1$–$T_4$ are controlled by a control circuit (not shown) on the basis of the pulse-width modulation output 33. Directions of a current fed from direct-current power supply 9 and passing through the coil L is controlled as shown by an arrow X or an arrow Y, by switching operations of the switching elements $T_1$–$T_4$.

Figure 7A:
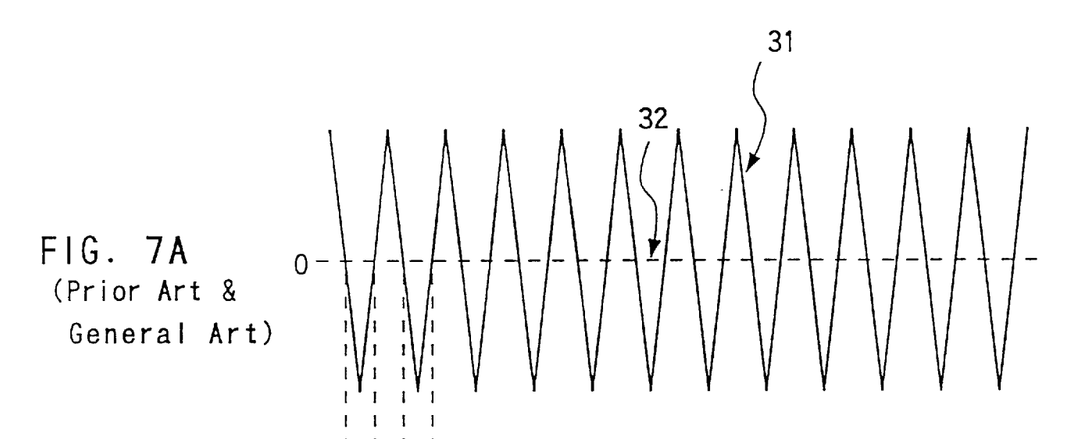
FIG. 7A is the diagram representing the triangular waveform signal 31.
Figure 7B:
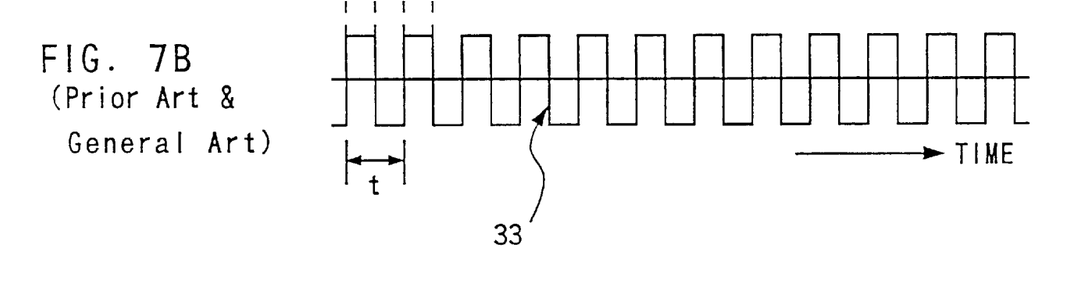
FIG. 7B is the diagram representing the output signal of an inverter circuit when the torque reference is zero.

When the level as shown in FIG. 7A of the torque reference 32 is zero, or neutral between positive and negative level, the switching elements $T_1$–$T_4$ are switched so as to output a signal of a waveform as shown in FIG. 7B. Then, the duty ratio of the pulse-width modulation output 33 is 50 percent. In every one cycle t of the triangular waveform signal 31, the current flows through the coil L alternately in the directions X and Y as shown in FIG. 7B. A carrier frequency of the triangular waveform signal 31 is selected from several kHz to several to ten kHz in general. Therefore, the period t of the current passing through the coil L is about several ten μs.

Since the current having a short period t alternately passes through the coil L in the direction of the arrow X or the direction of the arrow Y, an average current in the coil L is substantially zero and is corresponding to the torque reference 32. Hereupon, a current is supplied to the coil L from the battery 9, and that the 50% duty ratio current shown in FIG. 7B is worthless as a whole. The intensity of this ineffective current is about one four hundredth (¹⁄₄₀₀) of a rated current.

The worthless or ineffective current is only useful for a case which requires a holding torque or regenerative braking. In a conventional electric automobile, an electric power from the battery is worthlessly dissipated due to the above-mentioned ineffective current. It has been a problem to reduce the worthless loss of the electric power of the battery 9 of an electric car. In the case of the electric automobile having a high voltage power source, such loss of the electric power due to the ineffective current reaches several hundred watts in total, and therefore cannot be disregarded.

In order to save such loss of the electric power, in a control apparatus of the synchronous motor of electric car driven by a series-connected high voltage battery, its control system has long been demanded to achieve as small worthless current loss as possible. The present invention is to solve the above-mentioned subject.

OBJECT AND SUMMARY OF THE INVENTION

An object of the present invention is to provide a control method and an apparatus of a motor which prevents a loss of an electric energy of a battery by interrupting or suspending power supply from the battery when a torque reference level is zero, thereby improving an efficiency of the battery.

In the method and apparatus for controlling of an inverter in which a synchronous motor is controlled by a pulse width modulation of an output of the battery (hereinafter is referred to as PWM control), when the torque reference to the synchronous motor is zero, a switching operation of the inverter is suspended or stopped.

Furthermore, also when the torque reference is zero and the rotating speed of the synchronous motor is no higher than a predetermined reference value, the switching operation of the inverter is suspended or stopped.

When the torque reference is zero and the state that the rotating speed of the synchronous motor is no higher than the predetermined reference value continues for a predetermined time length, the switching operation of the inverter is suspended.

According to the present invention, when the torque reference level to the motor is zero, the switching operation of the inverter is suspended and current supply from a power source e.g. a battery is stopped, and thereby, the electric energy of the battery can be saved, and efficiency of use of the battery is improved.

When the torque reference to the motor is zero and the rotating speed of the motor is no higher than the predetermined reference value, or when the torque reference level to the motor is zero and the state that the rotating speed of the motor is no higher than the predetermined reference value continues for the predetermined time length, the switching operation of the inverter is suspended. Therefore, when the rotating speed of the motor is larger than the reference value in deceleration step, a charging current produced by regenerative braking is stored in the battery. When the rotating speed of the motor is no higher than the reference value, the current supply to the motor is suspended, and the energy of the battery can be saved. Since a loss of the energy in the battery is prevented, the mileage of automobile covered by one charging of the battery greatly increases for example.

According to the present invention, a service life of the battery also increases by preventing the loss of the electric energy in the battery and improves the efficiency in use of the electric power.

DESCRIPTION OF THE PREFERRED EMBODIMENT

An embodiment of the present invention will be described in detail with reference to FIG. 1 through FIG. 6B.

Figure 1:
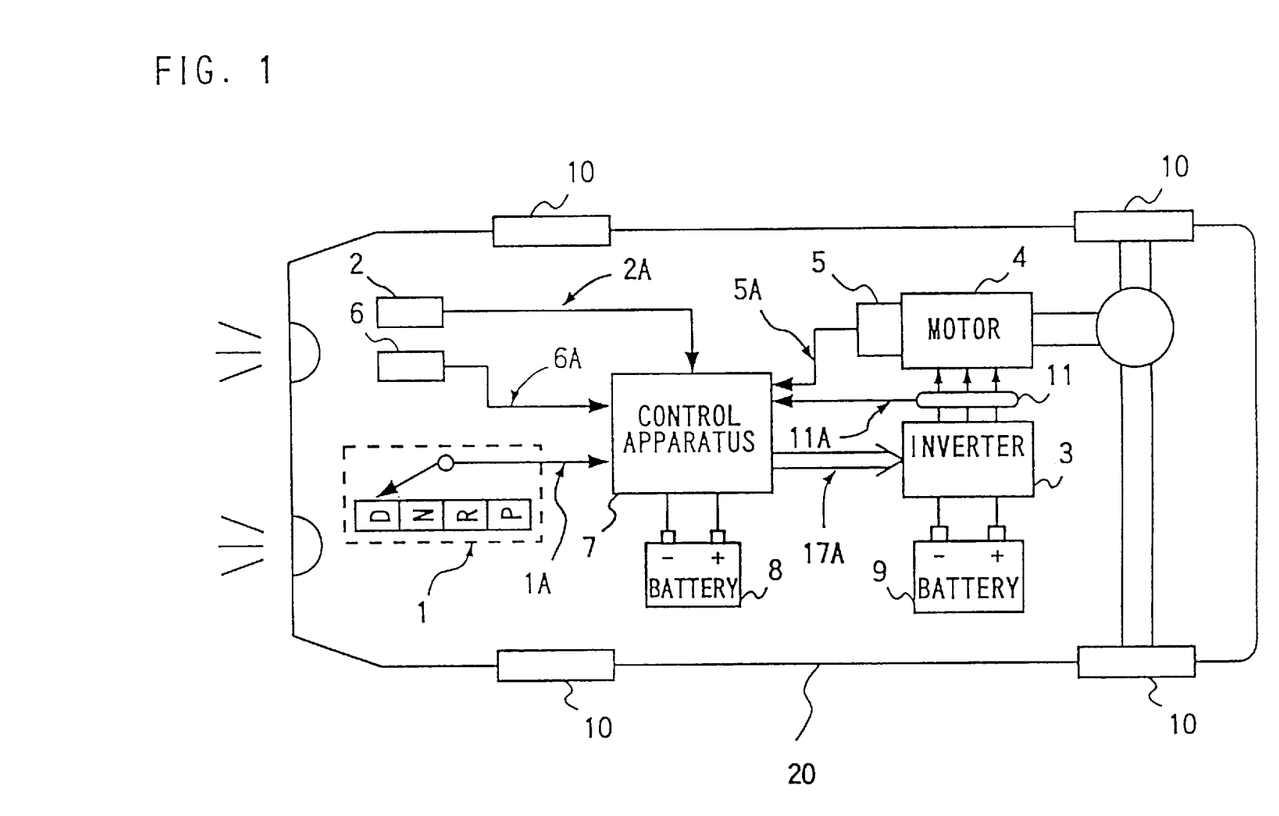
FIG. 1 is a schematic plan view of an electric automobile having a motor control apparatus of an embodiment of the present invention.
Figure 2:
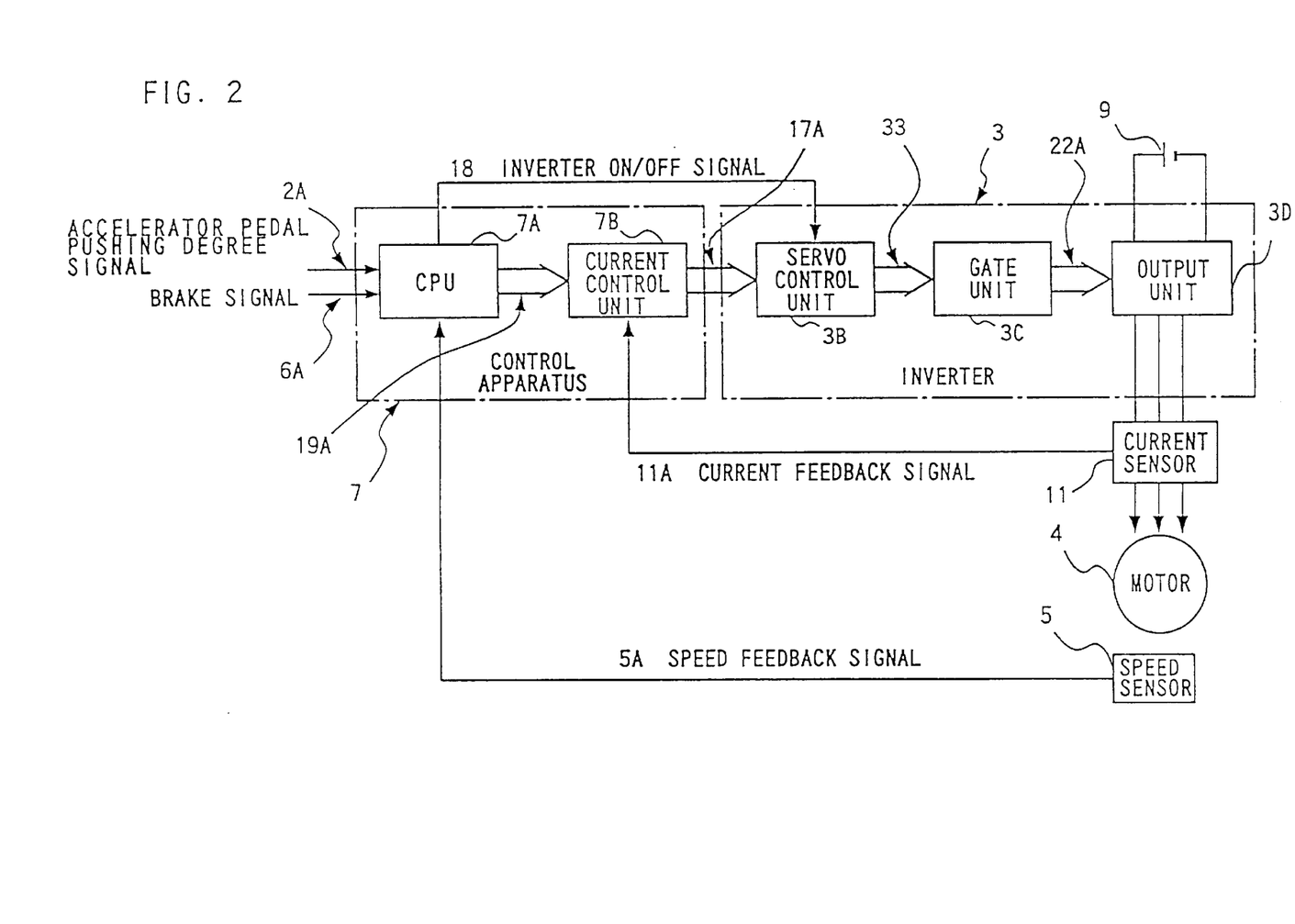
FIG. 2 is a block diagram of the motor control apparatus of the embodiment of the present invention.

The embodiment shown in FIG. 1 and FIG. 2 is an example which is applied to an electric automobile. FIG.1 is a plan view of an electric automobile 20 and shows an arrangement of relevant equipments. Referring to FIG. 1, a permanent magnet rotor type synchronous motor 4 (hereinafter is simply referred to as motor) is controlled by a control apparatus 7, and rotates driving wheels 10. A transmission signal 1A representing a transmission position of a shift lever system 1 is applied to the control apparatus 7. An acceleration-pedal pushing-down degree signal 2A representing pushing-down degree of an accelerator pedal 2 and a brake signal 6A representing operation of a brake pedal 6 are applied to the control apparatus 7. A speed sensor 5 (which is a tachometer) detects rotation direction and rotation speed of the motor 4, and a speed feedback signal 5A is output from the speed sensor 5. The speed feedback signal 5A is applied to the control apparatus 7. A current sensor 11 detects a current of the motor 4 and output a current feedback signal 11A. The current feedback signal 11A is applied to the control apparatus 7. The control apparatus 7 is fed from a battery 8 for the control apparatus 7. A current from a battery 9 is supplied to the motor 4 by control of the control apparatus 7 through an inverter 3.

The control apparatus 7 generates an torque reference 17A by processing the acceleration-pedal pushing-down degree signal 2A, the brake pedal pushing degree signal 6A, the speed feedback signal 5A and the current feedback signal 11A. The torque reference 17A is applied to the inverter 3 so as to control an output current and operation frequency of the inverter 3.

The inverter 3 carries out a switching operation by receiving the torque reference 17A, and the current from the battery 9 is supplied to the motor 4. The electric automobile 20 is driven by rotation of driving wheels 10 through rotation of the motor 4.

FIG. 2 is a block diagram of the motor control apparatus of the present embodiment. Referring to FIG. 2, a CPU 7A receives the acceleration-pedal pushing-down degree signal 2A from the accelerator 2, the brake pedal pushing degree signal 6A from the brake 6 and the speed feedback signal 5A from the speed sensor 5. An output of the CPU 7A is applied to a current control unit 7B. The current control unit 7B supplies the torque reference 17A to a servo control unit 3B so as to control the motor 4 in compliance with the current feedback signal 11A of the current sensor 11. The CPU generates an inverter ON/OFF signal 18 which activates or deactivates the inverter 3. The inverter ON/OFF signal 18 is applied to the servo control unit 3B. When the inverter ON/OFF signal 18 is in ON state, the inverter 3 is activated. On the contrary, when the inverter ON/OFF signal 18 is in OFF state, the inverter 3 is deactivated thereby to stop or suspend its current, hence current from the battery 8.

In the CPU 7A of the control apparatus 7, the acceleration-pedal pushing-down degree signal 2A is processed to produce a speed deviation signal 19A. The speed deviation signal 19A is applied to the current control unit 7B as a current signal which is converted by a known PI control operation.

In the current control unit 7B, the speed deviation signal 19A is compared with the current feedback signal 11A from the current sensor 11, which detects the output current of the inverter 3, and a current deviation signal is obtained.

The current deviation signal is processed into the torque reference signal 17A by known PI controlling, and the torque reference signal 17A is applied to the servo control unit 3B, so that a current corresponding to the acceleration-pedal pushing-down degree signal 2A is output from the inverter 3. A torque reference 32 in FIG. 4 for the PWM control is generated on the basis of the torque reference signal 17A.

When a level of the torque reference signal 17A is high, an amplitude of a pulse-width modulation output 33 in the PWM control increases, and an output current also increases. On the contrary, when the level of the torque reference signal 17A is low, the pulse width of the PWM output 33 decreases and the output current also decreases.

In the servo control unit 3B, the pulse-width modulation output 33 (hereinafter is referred to as PWM output 33) which is the output of the comparator 22 is generated as shown in FIG. 4. The PWM output 33 obtained by comparison of torque reference 32 and the triangular waveform signal 31 is shown in FIG. 6B. The control unit 3B controls output of the PWM output 33 to a gate unit 3C in compliance with the inverter ON/OFF signal 18 which is inputted from the control apparatus 7.

Figure 3:
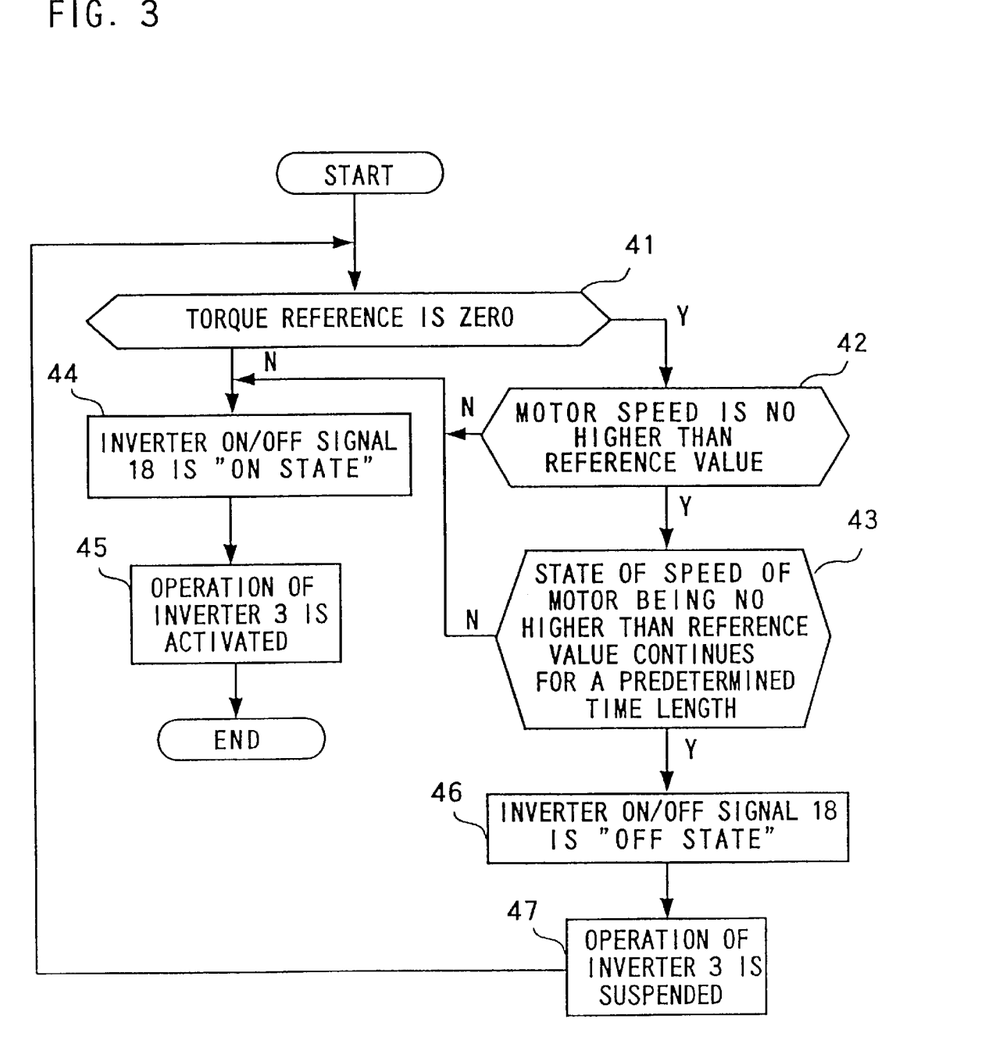
FIG. 3 is a flowchart of operation of a motor control method of the present invention.

In operation, the inverter ON/OFF signal 18 is not output when the level of the torque reference signal 17A is zero (FIG. 3, Steps 41, 46, 47). In another operation method, the inverter ON/OFF signal 18 is not output (OFF state) when a level of the torque reference signal 17A is zero and the rotating speed of the motor 4 is no higher than a predetermined reference value. When the inverter ON/OFF signal 18 is not applied to the servo control unit 3B, a switching signal is not applied to the gate unit 3C from the servo control unit 3B.

In the gate unit 3C, a switching signal 22A is generated in compliance with the PWM output 33 output from the servo control unit 3B. The switching circuit 23 of FIG. 5 is disposed in an output unit 3D and is controlled by the switching signal 22A. The output unit 3D comprises three switching circuits 23 for the motor 4 of three phases. FIG. 5 shows one example of switching circuit 23 for one phase. Output transistors $T_1$–$T_4$ of each switching circuit 23 are controlled by the switching signal 22A, and the current of the battery 9 is supplied to the motor 4. When the inverter ON/OFF signal 18 to the servo control unit 3B is in OFF state, operation of the output unit 3D is suspended and the current of the battery 9 is not supplied to the motor 4.

The output unit 3D is controlled by the abovementioned switching signal 22A, and makes switching operation of the output current of the battery 9.

A three-phase driving output based on the PWM output 33 (FIGS. 2,4) obtained by the switching operation is utilized for controlling the motor 4.

In deceleration step of the electric automobile, a charging current from the motor 4 produced by regenerative braking is supplied to the battery 9 when speed is higher than a predetermined value. However, when the speed is lowered below a predetermined value, for example 250 r.p.m., whereat the regeneration voltage is too small for supplying to the battery, and on the other hand the motor rotation loses smoothness, operation of the inverter 3 is suspended and the circuit of the regenerative braking is cut off from the battery 9, thereby preventing useless discharging of the battery 9 to the circuit and improving smoothness of running. A current supply to the motor 4 is also suspended and useless consumption of the battery 9 due to the current to the motor 4 is prevented. Consequently, the energy of the battery 9 can be used very efficiently. Since the electric power of the battery 9 is saved, maximum travel distance of the electric automobile covered by one charge of the battery 9 can be greatly increased.

In the embodiment shown in FIG. 2 the current control unit 7B is disposed in the control apparatus 7, but it can be disposed in the inverter 3. Though the control apparatus 7 and the inverter 3 are separately configured in the embodiment, these two can be configured as one apparatus carrying out functions of both.

Furthermore, the embodiment has been configured that the inverter ON/OFF signal 18 is not output when the level of the torque reference 17A is zero and the rotating speed of the motor 4 is no higher than the reference value.

Another configuration may be made such that the inverter ON/OFF signal 18 is suspended, when the level of the torque reference 17A is zero, or alternatively, when the level of the torque reference 17A is zero and that the state of the motor speed being no higher than a second reference value, for example 300 r.p.m., continues for a predetermined time length, the operation of switching timing output of the servo control unit 3B is suspended (FIG. 3, Steps 41, 43, 46, 47), thereby to stop the operation of the inverter 3. In such motor rotation speed, although a very small regeneration current would charge the battery, the amount of current is too small to be meaningful, while low frequency vibration of the motor occurs and causes uncomfortable noise to the vehicle body, and also gives adverse effect to the motor and power transmission mechanism. Therefore, continuation for long time of motor driving (electrifying) at the motor speed no higher than the second reference value e.g. said 300 r.p.m. for a predetermined time length, for example one minute, should better be suspended. Accordingly, this configuration has a technical advantage in the low speed driving for a certain time length.

Although the present invention has been described in terms of the presently preferred embodiments, it is to be understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An improved method of controlling a synchronous motor of an electric automobile, the motor being driven by a pulse width modulated current fed from at least one battery through an inverter, the improvement comprising the steps of:

obtaining an acceleration pedal pushing-down degree signal representative of a degree to which an acceleration pedal of the automobile is pushed down;

obtaining a brake pedal pushing-down degree signal representative of a degree to which a brake pedal of the automobile is pushed down;

obtaining a speed feedback signal representative of a speed of the motor;

obtaining a current feedback signal representative of a current of the motor;

processing the acceleration pedal pushing-down degree signal, the brake pedal pushing-down degree signal, the speed feedback signal, and the current feedback signal to produce a torque reference;

producing a pulse width modulation (PWM) output signal based on the torque reference, the PWM output signal being applied to control the inverter;

suspending switching operation of the inverter when the torque reference is zero and the speed feedback signal indicates that the speed of the motor is less than a first predetermined value, thereby stopping current flow from the battery to said motor of the electric automobile; and supplying a current produced by the motor by regenerative braking to the battery when the torque reference is zero and the speed feedback signal indicates that the speed of the motor is greater than a second predetermined value.

2. An improved method of controlling a synchronous motor of an electric automobile, the motor being driven by a pulse width modulated current fed from at least one battery through an inverter, the improvement comprising the steps of:

obtaining an acceleration pedal pushing-down degree signal representative of a degree to which an acceleration pedal of the automobile is pushed down;

obtaining a brake pedal pushing-down degree signal representative of a degree to which a brake pedal of the automobile is pushed down;

obtaining a speed feedback signal representative of a speed of the motor;

obtaining a current feedback signal representative of a current of the motor;

processing the acceleration pedal pushing-down degree signal, the brake pedal pushing-down degree signal, the speed feedback signal, and the current feedback signal to produce a torque reference;

producing a pulse width modulation (PWM) output signal based on the torque reference, the PWM output signal being applied to control the inverter;

suspending switching operation of the inverter when the torque reference is zero and the speed feedback signal indicates that the speed of the motor is less than a first predetermined long-time-low-speed reference value for a predetermined time length, thereby stopping current flow from the battery to said motor of the electric automobile; and supplying a current produced by the motor by regenerative braking to the battery when the torque reference is zero and the speed feedback signal indicates that the speed of the motor is greater than a second predetermined value.

3. An improved apparatus for controlling a synchronous motor of an electric automobile, the motor being driven by a pulse width modulated current fed from at least one battery through an inverter, the improvement comprising:

a control apparatus including a CPU which:

obtains an acceleration pedal pushing-down degree signal representative of a degree to which an acceleration pedal of the automobile is pushed down;

obtains a brake pedal pushing-down degree signal representative of a degree to which a brake pedal of the automobile is pushed down;

obtains a speed feedback signal representative of a speed of the motor;

obtains a current feedback signal representative of a current of the motor;

processes the acceleration pedal pushing-down degree signal, the brake pedal pushing-down degree signal, the speed feedback signal, and the current feedback signal to produce a torque reference, a pulse width modulation (PWM) output signal being produced based on the torque reference, the PWM output signal being applied to control the inverter;

suspends switching operation of the inverter when the torque reference is zero and the speed feedback signal indicates that the speed of the motor is less than a first predetermined value, thereby stopping current flow from the battery to said motor of the electric automobile; and supplies a current produced by the motor by regenerative braking to the battery when the torque reference is zero and the speed feedback signal indicates that the speed of the motor is greater than a second predetermined value.

4. An improved apparatus for controlling a synchronous motor of an electric automobile, the motor being driven by a pulse width modulated current fed from at least one battery through an inverter, the improvement comprising:

a control apparatus including a CPU which:

obtains an acceleration pedal pushing-down degree signal representative of a degree to which an acceleration pedal of the automobile is pushed down;

obtains a brake pedal pushing-down degree signal representative of a degree to which a brake pedal of the automobile is pushed down;

obtains a speed feedback signal representative of a speed of the motor;

obtains a current feedback signal representative of a current of the motor;

processes the acceleration pedal pushing-down degree signal, the brake pedal pushing-down degree signal, the speed feedback signal, and the current feedback signal to produce a torque reference, a pulse width modulation (PWM) output signal being produced based on the torque reference, the PWM output signal being applied to control the inverter;

suspends switching operation of the inverter when the torque reference is zero and the speed feedback signal indicates that the speed of the motor is less than a first predetermined long-time-low-speed reference value for a predetermined time length, thereby stopping current flow from the battery to said motor of the electric automobile; and supplies a current produced by the motor by regenerative braking to the battery when the torque reference is zero and the speed feedback signal indicates that the speed of the motor is greater than a second predetermined value.

5. An improved method of controlling a synchronous motor of an electric automobile, the motor being driven by a pulse width modulated current fed from at least one battery through an inverter, the improvement comprising the steps of:

obtaining an acceleration pedal pushing-down degree signal representative of a degree to which an acceleration pedal of the automobile is pushed down;

obtaining a brake pedal pushing-down degree signal representative of a degree to which a brake pedal of the automobile is pushed down;

obtaining a speed feedback signal representative of a speed of the motor;

obtaining a current feedback signal representative of a current of the motor;

processing the acceleration pedal pushing-down degree signal, the brake pedal pushing-down degree signal, the speed feedback signal, and the current feedback signal to produce a torque reference;

producing a current from the battery based on the acceleration pedal pushing-down degree signal, the brake pedal pushing-down degree signal, the speed feedback signal, and the current feedback signal, the current being applied to the inverter;

suspending switching operation of the inverter when the torque reference is zero, thereby stopping current flow from the battery to said motor of the electric automobile; and supplying a current produced by the motor by regenerative braking to the battery when the torque reference is zero and the speed feedback signal indicates that the speed of the motor is greater than a predetermined value.

6. An improved method of controlling a synchronous motor of an electric automobile, the motor being driven by a pulse width modulated current fed from at least one battery through an inverter, the improvement comprising the steps of:

obtaining an acceleration pedal pushing-down degree signal representative of a degree to which an acceleration pedal of the automobile is pushed down;

obtaining a brake pedal pushing-down degree signal representative of a degree to which a brake pedal of the automobile is pushed down;

obtaining a speed feedback signal representative of a speed of the motor;

obtaining a current feedback signal representative of a current of the motor;

processing the acceleration pedal pushing-down degree signal, the brake pedal pushing-down degree signal, the speed feedback signal, and the current feedback signal to produce a torque reference;

producing a current from the battery based on the acceleration pedal pushing-down degree signal, the current being applied to the inverter;

suspending switching operation of the inverter when the torque reference is zero, thereby stopping current flow from the battery to said motor of the electric motor.

7. An improved method of controlling a synchronous motor of an electric automobile, the motor being driven by a pulse width modulated current fed from at least one battery through an inverter, the improvement comprising the steps of:

obtaining an acceleration pedal pushing-down degree signal representative of a degree to which an acceleration pedal of the automobile is pushed down;

obtaining a brake pedal pushing-down degree signal representative of a degree to which a brake pedal of the automobile is pushed down;

obtaining a speed feedback signal representative of a speed of the motor;

obtaining a current feedback signal representative of a current of the motor;

processing the acceleration pedal pushing-down degree signal, the brake pedal pushing-down degree signal, the speed feedback signal, and the current feedback signal to produce a torque reference;

producing a current from the battery based on the acceleration pedal pushing-down degree signal, the brake pedal pushing-down degree signal, the speed feedback signal, and the current feedback signal, the current being applied to the inverter;

suspending switching operation of the inverter when the torque reference is zero and the speed feedback signal indicates that the speed of the motor is less than a first predetermined value, thereby stopping current flow from the battery to said motor of the electric automobile; and supplying a current produced by the motor by regenerative braking to the battery when the torque reference is zero and the speed feedback signal indicates that the speed of the motor is greater than a second predetermined value.

8. An improved method of controlling a synchronous motor of an electric automobile, the motor being driven by a pulse width modulated current fed from at least one battery through an inverter, the improvement comprising the steps of:

obtaining an acceleration pedal pushing-down degree signal representative of a degree to which an acceleration pedal of the automobile is pushed down;

obtaining a brake pedal pushing-down degree signal representative of a degree to which a brake pedal of the automobile is pushed down;

obtaining a speed feedback signal representative of a speed of the motor;

obtaining a current feedback signal representative of a current of the motor;

processing the acceleration pedal pushing-down degree signal, the brake pedal pushing-down degree signal, the speed feedback signal, and the current feedback signal to produce a torque reference;

producing a current from the battery based on the acceleration pedal pushing-down degree signal, the current being applied to the inverter;

suspending switching operation of the inverter when the torque reference is zero and the speed feedback signal indicates that the speed of the motor is less than a first predetermined value, thereby stopping current flow from the battery to said motor of the electric automobile; and supplying a current produced by the motor by regenerative braking to the battery when the torque reference is zero and the speed feedback signal indicates that the speed of the motor is greater than a second predetermined value.

9. The improved method of claim 1, comprising the step of:

supplying a current produced by the motor by regenerative braking to the battery when the torque reference is zero and the speed feedback signal indicates that the speed of the motor is greater than the first predetermined value.

* * * * *